Patented June 2, 1936

2,042,795

UNITED STATES PATENT OFFICE 2,042,795

PLASTIC COMPOSITION AND METHOD OF COMPOUNDING THE SAME

Arthur F. Rowe, Lansing, Mich.

No Drawing. Application January 5, 1934, Serial No. 705,397

7 Claims. (Cl. 106—37)

This invention relates to plastic compositions and the method of compounding the same. This application is a continuation in part of my earlier application Serial No. 472,492, filed August 1st, 1930.

The principal object of this invention is to provide a plastic composition which dries upon exposure to the air without shrinking and which when dried is hard and tough but not brittle. This object is attained in part by combining various ingredients in the proportions specified hereinafter and more particularly by the method of compounding the same.

Prior to the present invention there were various plastic compositions for use in filling wood crevices and similar purposes. All of these plastic compositions of the prior art have a tendency either to shrink and become brittle upon exposure to the air or are soluble in various fluids such as water, gasolene and lacquer. The present invention provides a plastic composition which hardens upon drying but does not shrink and which is insoluble in the various fluids mentioned above as well as most others. Accordingly, the plastic composition compounded as hereinafter described is especially suitable for use in filling screw holes, or the like, in the bottom of boats or other articles normally immersed in water or other fluids. The present plastic composition is also especially adapted for use in filling crevices in furniture and similar articles where lacquer or similar finishing materials are used as a coating over the plastic composition.

In the preferred form of the invention a small quantity of bleached litharge is added to a quantity of nitro-cellulose solvent. After being introduced into the nitro-cellulose solvent the litharge is worked in any suitable manner to break the same up into finely divided particles and to thoroughly mix the same with the solvent. Preferably as much litharge is added to the nitro-cellulose solution as the solution will hold in suspension. It should be here understood that, while it is believed that the litharge is merely suspended in the form of fine particles in the nitro-cellulose solution, it may be that the same is dissolved or that a chemical reaction occurs between the nitro-cellulose solution and the litharge. Regardless of the nature of the action which occurs it is essential that the litharge be thoroughly mixed with the nitro-cellulose solution until the resulting product is homogeneous throughout.

The nitro-cellulose solvent may consist of any of the conventional solvents of this character. A satisfactory solvent comprises thirty parts of butyl acetate, sixty parts of toluol and ten parts of butyl alcohol. This solution is what may be termed a slow solvent. A solution consisting of fifty parts of toluol, twenty-five parts of thymal alcohol, twelve and a half parts ethyl acetate and twelve and a half parts benzol constitutes what may be called a fast solvent. The nature of the use to which the plastic composition is to be subjected will determine the character of the solvent which is to be used.

After the litharge has been added to the nitro-cellulose solvent as described above, the product thus formed is added to a nitro-cellulose solution. The quantity of the nitro-cellulose solution is such that the mixture of litharge and nitro-cellulose solvent can be thoroughly and homogeneously admixed therewith before the resulting mass thickens to such an extent as to prevent further admixture. The solvent containing the litharge and the nitro-cellulose solution is stirred or mixed continuously until the solution begins to thicken.

While it is preferred to form a premixture of litharge and nitro-cellulose solvent as described herein and thereafter add a nitro-cellulose solution thereto, if desired, the litharge may be added to a relatively large quantity of nitro-cellulose solvent in which case any form of nitro-cellulose (not in solution) and a suitable ester gum may then be added to the mixture of nitro-cellulose solvent and the litharge. Likewise, the litharge may be added directly to an adequate quantity of nitro-cellulose solution without the preliminary formation of the mixture of litharge and nitro-cellulose solvent providing the litharge is homogeneously mixed with the nitro-cellulose solution. It has been found, however, that the nitro-cellulose solution has a tendency to thicken so rapidly upon the introduction of litharge directly thereinto that it is substantially impossible to distribute the litharge homogeneously throughout the same without first forming a preliminary mixture of nitro-cellulose solvent and litharge. In any case, it is essential that the litharge be so thoroughly mixed with the nitro-cellulose solution that it is homogeneously distributed throughout that solution.

Where it is desired to give the plastic composition a distinctive color the necessary quantity of suitable pigments may be added either to the mixture of litharge and nitro-cellulose solvent or to the nitro-cellulose solution at the time the mixture of litharge and nitro-cellulose solvent is added thereto.

After the litharge has been mixed with the nitro-cellulose solution to form a homogeneous viscous mass, the same is introduced into a receptacle containing a homogeneous mixture of various filler materials. These fillers which have been previously thoroughly mixed preferably include finely divided wood flour, silica, and whiting. The proportion of these fillers will vary depending upon the characteristics desired in the resulting product. Any other suitable fillers in varying quantities may be used although it is preferred in any case that some form of fibrous material be included in the fillers as such material forms the best type of binder.

The nitro-cellulose solution containing the litharge and the fillers is thoroughly kneaded until the resulting product is of a uniform plastic consistency. The quantity and proportions of fillers used will depend upon the character of plastic composition desired. For a composition which will be suitable as a surface glaze a relatively small quantity of filler will be used. Where the resulting product is to be used as a filler for screw holes, or the like, a relatively greater quantity of filler will be used.

The nitro-cellulose solution used in preparing the present plastic composition preferably consists of two pounds of nitro-cellulose and one pound of ester gum dissolved in one gallon of nitro-cellulose solvent. The solvent preferably consists, as mentioned hereinbefore, of thirty parts of butyl acetate, sixty parts of toluol and ten parts of butyl alcohol.

The fillers are preferably mixed in the following approximate proportions:

|  | Per cent |
|---|---|
| Whiting | 65 to 75 |
| Silex | 10 to 15 |
| Wood flour | 10 to 25 |

The litharge is mixed with the nitro-cellulose solution in the approximate proportion of three ounces of litharge to three quarts of nitro-cellulose solution. The fillers are mixed with the nitro-cellulose solution containing the litharge in the approximate proportions of three quarts of solution to from ten to fifteen pounds of filler.

A complete formula for compounding approximately twenty pounds of plastic composition is as follows:

| Nitro-cellulose solution | quarts | 3 |
|---|---|---|
| Litharge | ounces | 3 |
| Whiting | pounds | 8 |
| Silex | do | 1½ |
| Wood flour | do | 1 to 3 |

While only certain typical proportions of the ingredients required have been set forth herein it should be understood that these may be varied within relatively wide limits so long as the litharge is ultimately thoroughly and homogeneously mixed with the nitro-cellulose solution. The scope of the invention is indicated in the appended claims.

I claim:

1. The method of compounding a plastic composition which comprises forming a preliminary mixture of nitro-cellulose solvent and litharge, introducing into and admixing with such mixture a quantity of nitro-cellulose, and thereafter introducing into said admixture and thoroughly kneading therewith a quantity of inert fillers and a pigment.

2. The method of compounding a plastic composition which comprises forming a preliminary homogeneous mixture of litharge and nitro-cellulose solvent, introducing as much nitro-cellulose solution into said preliminary mixture as can be thoroughly mixed therewith without solidifying, thoroughly mixing said preliminary mixture and said cellulose solution, and adding to said mixture a quantity of inert filler and fibrous material.

3. The method of compounding a plastic composition which comprises forming a preliminary viscous body comprising a homogeneous mixture of a small quantity of litharge with a relatively large quantity of nitro-cellulose solution, forming a second preliminary body which comprises a homogeneous mixture of finely divided wood flour, silica and whiting, combining the two bodies and thoroughly kneading the same until the entire mass is of uniform consistency.

4. The method of compounding a plastic composition which comprises forming a nitro-cellulose solvent which contains approximately thirty (30) parts of butyl acetate, sixty (60) parts of toluol and ten (10) parts of butyl alcohol, introducing a small quantity of litharge into said solution and stirring the same until the litharge is broken up into very finely divided particles and distributed homogeneously throughout said solution, introducing said mixture of litharge and solvent into as much nitro-cellulose solution as can be thoroughly admixed therewith, mixing said nitro-cellulose solution with said mixture of litharge and solvent until the same begins to thicken, adding the viscous mass thus formed to as much finely divided filler as can be thoroughly mixed therewith without solidifying, and kneading said filler and said viscous mass until the resulting product is of a uniform plastic consistency.

5. A moldable plastic composition which dries and hardens upon exposure to the air consisting of a homogeneous mixture of wood flour, whiting, silex, litharge, and nitro-cellulose solution.

6. A plastic composition consisting of approximately one and one-half per cent (1½%) of litharge, sixty-eight and one-half per cent (68½%) of whiting, thirteen per cent (13%) of silex, and seventeen per cent (17%) of wood flour, combined with sufficient nitro-cellulose solution to form a moldable puttylike mass.

7. A moldable plastic composition produced by the method defined in claim 1.

ARTHUR F. ROWE.